United States Patent
Pruvost et al.

(10) Patent No.: US 7,162,590 B2
(45) Date of Patent: Jan. 9, 2007

(54) MEMORY BUS WITHIN A COHERENT MULTI-PROCESSING SYSTEM HAVING A MAIN PORTION AND A COHERENT MULTI-PROCESSING PORTION

(75) Inventors: Julie-Anne Francoise Marie Pruvost, Antibes (FR); Norbert Bernard Eugene Lataille, Antibes (FR); Stuart David Biles, Cambridge (GB)

(73) Assignee: ARM Limited, Cambridge (GB)

( * ) Notice: Subject to any disclaimer, the term of this patent is extended or adjusted under 35 U.S.C. 154(b) by 324 days.

(21) Appl. No.: 10/788,315

(22) Filed: Mar. 1, 2004

(65) Prior Publication Data
US 2005/0005072 A1    Jan. 6, 2005

(30) Foreign Application Priority Data
Jul. 2, 2003    (GB)    .................................. 0315506.6

(51) Int. Cl.
*G06F 13/00*    (2006.01)
*G06F 12/00*    (2006.01)
(52) U.S. Cl. ........................ 711/147; 711/141; 710/105
(58) Field of Classification Search ............... 711/146, 711/141, 147, 118; 710/105
See application file for complete search history.

(56) References Cited

U.S. PATENT DOCUMENTS

| | | | |
|---|---|---|---|
| 6,304,945 B1 | 10/2001 | Koenen | |
| 6,868,481 B1* | 3/2005 | Gaither et al. | ............... 711/119 |
| 2003/0023794 A1 | 1/2003 | Akrishnan et al. | |
| 2003/0115402 A1 | 6/2003 | Dahlgren et al. | |
| 2004/0039880 A1* | 2/2004 | Pentkovski et al. | ......... 711/146 |
| 2004/0068595 A1* | 4/2004 | Dieffenderfer et al. | ..... 710/105 |
| 2004/0073623 A1* | 4/2004 | Benkual et al. | ............. 709/213 |
| 2005/0005073 A1* | 1/2005 | Pruvost et al. | ............. 711/148 |
| 2005/0010728 A1* | 1/2005 | Piry et al. | ................... 711/147 |

* cited by examiner

*Primary Examiner*—Hong Kim
(74) *Attorney, Agent, or Firm*—Nixon & Vanderhye P.C.

(57) ABSTRACT

Within a coherent multi-processing system multiple processor cores 4, 6 are coupled via respective memory buses to a memory access control unit 16. The memory buses are formed of a uni-processing portion containing signals specifying a memory access request in accordance with a uni-processing protocol. This uni-processing bus is augmented by a multi-processing bus containing signals giving additional information concerning memory access requests which may be used by the memory access control unit to service those requests and manage coherency within the system.

18 Claims, 9 Drawing Sheets

MEMORY BUS WITHIN A COHERENT MULTI-PROCESSING SYSTEM HAVING A MAIN PORTION AND A COHERENT MULTI-PROCESSING PORTION

BACKGROUND OF THE INVENTION

1. Field of the Invention

This invention relates to data processing systems. More particularly, this invention relates to coherent multi-processing systems in which two or more processor cores share access to a coherent memory region.

2. Description of the Prior Art

It is known to provide coherent multi-processing systems in which two or more processor cores share access to a coherent memory region. Such systems are typically used to gain higher performance throughout the different processor cores executing respective data processing operations in parallel. Known data processing systems which provide such coherent multi-processing capabilities include IBM370 systems and SPARC multi-processing systems.

An important aspect of such coherent multi-processing systems is the need to co-ordinate the activity of the different processor cores and in particular manage the manner in which they access the coherent memory which they share. As an example, if one of the processor cores has read a data value from memory and is currently updating that data value prior to writing it back to memory, then an intervening action by another processor core seeking to read that same data value from the coherent shared memory needs to be provided with the updated data value even though this has not yet been written back to the main memory and is only present in one of the other processor cores. This type of situation requires coherency management and is one example of the type of coherent multi-processing management operations which can typically be provided by a memory access control unit within such a coherent multi-processing system. The memory access control unit is typically coupled to the processor cores by a memory bus carrying signals identifying desired memory transactions and signals characterising the state of the processor cores and required operations.

SUMMARY OF THE INVENTION

Viewed from one aspect the present convention provides apparatus for processing data, said apparatus comprising:

a plurality of processor cores operable to perform respective data processing operations, at least two of said processor cores being operable in a coherent multi-processing mode sharing access to a coherent memory region; and a memory access control unit operable to receive memory access requests via respective memory buses from said plurality of processor cores and in response to a memory access request from one of said processor cores operating in a coherent multi-processing mode to perform coherent multi-processing management operations to control access to said coherent memory region; wherein at least those memory buses of processor cores operating in said coherent multi-processor mode include a main portion and a coherent multi-processing portion, said main portion carrying main signals generated by said processor core and specifying a memory access request using a uni-processing memory request protocol and said coherent multi-processing portion carrying additional signals generated by said processor core and used by said memory access control unit in combination with said main signals to perform coherent multi-processing management operations to control access to said coherent memory region.

The invention recognises that advantages can be achieved when the memory bus connecting processor cores operating in a coherent multi-processing mode to a memory access control unit are partitioned into a main portion carrying mains signals following a uni-processing memory request protocol in combination with a coherent multi-processing portion carrying additional signals generated by the processor core and used in combination with the main signals to control coherent multi-processing management operations. Thus, a legacy uni-processing memory request protocol may be supported and used to specify a memory access request in a way that preserves backward compatibility with hardware and systems produced to operate with that uni-processing memory request protocol whilst the additional signals on the coherent multi-processing portion of the memory bus can be used to provide the additional information not relevant in a uni-processing system but which is required by the memory access control unit in a coherent multi-processing system in order to perform appropriate coherent multi-processing management operations.

As an example of the type of additional signals which may be used, preferred embodiments of the invention include a signal within the main signal specifying that a memory access request is a write request and a signal within the additional signals distinguishing between different types of write request in a manner appropriate to a coherent multi-processing system, such as distinguishing between a write request which either may or may not serve to force a new location for the current version of the data value relative to which other copies are to be referenced. A further example of the additional information given by the additional signals in distinguishing between different types of memory access request is a read request which may be identified as either a cache line fill or a cache line fill with invalidation of other storage locations.

Whilst the coherent multi-processing management operations performed by the memory access control unit could take a variety of different forms, the present technique is particularly useful when the coherent multi-processing system includes a cache memory associated with at least one of the processor cores operating in the coherent multi-processing mode and the memory access control unit serves to manage coherency between the cached value and a main memory value of a data value.

The coherent multi-processing portion of the memory bus may also be used to pass signals relating to coherent multi-processing management operations that are generated by the memory access control unit to the processor cores to command them to perform desired coherency control operations. This type of signal is not directly generated by another processor core but rather relates to the memory access control unit performing coherency control operations it determines to be necessary to deal with memory access requests that have or are being generated elsewhere.

The present technique is particularly useful in the context of a mixed system in which at least one of the processor cores is operable in a uni-processing mode as in this circumstance the main portion of the memory bus can be simply and directly used to specify desired uni-processing memory access requests with little or no modification being required to the elements involved.

The technique is also of particular value when a peripheral device is coupled to the main portion of the memory bus since such peripheral devices may be private to a particular processor core and accordingly not require any knowledge of the coherent multi-processing portion of the memory bus. Furthermore, the partitioning of the memory bus in accordance with the present technique provides advantageous backward compatibility with legacy private peripheral devices that already exist.

Whilst it will be appreciated that the present technique may be embodied with the processor cores being disposed on separate integrated circuits and with the memory bus being exposed external of the integrated circuits, preferred embodiments of the invention are ones in which the plurality of processor cores, the memory access control unit on the memory buses are all formed on a single integrated circuit.

Viewed from another aspect the present invention provides a method of processing data, said method comprising the steps of:

performing data processing operations upon respective ones of a plurality of processor cores, at least two of said processor cores being operable in a coherent multi-processing mode sharing access to a coherent memory region; and receiving memory access requests from said plurality of processor cores at a memory access control unit via respective memory buses; and in response to a memory access request from one of said processor cores operating in a coherent multi-processing mode, performing coherent multi-processing management operations to control access to said coherent memory region; wherein at least those memory buses of processor cores operating in said multi-processor mode include a main portion and a coherent multi-processing portion, said main portion carrying main signals generated by said processor core and specifying a memory access request using a uni-processing memory request protocol and said coherent multi-processing portion carrying additional signals generated by said processor core and used by said memory access control unit in combination with said main signals to perform coherent multi-processing management operations to control access to said coherent memory region.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
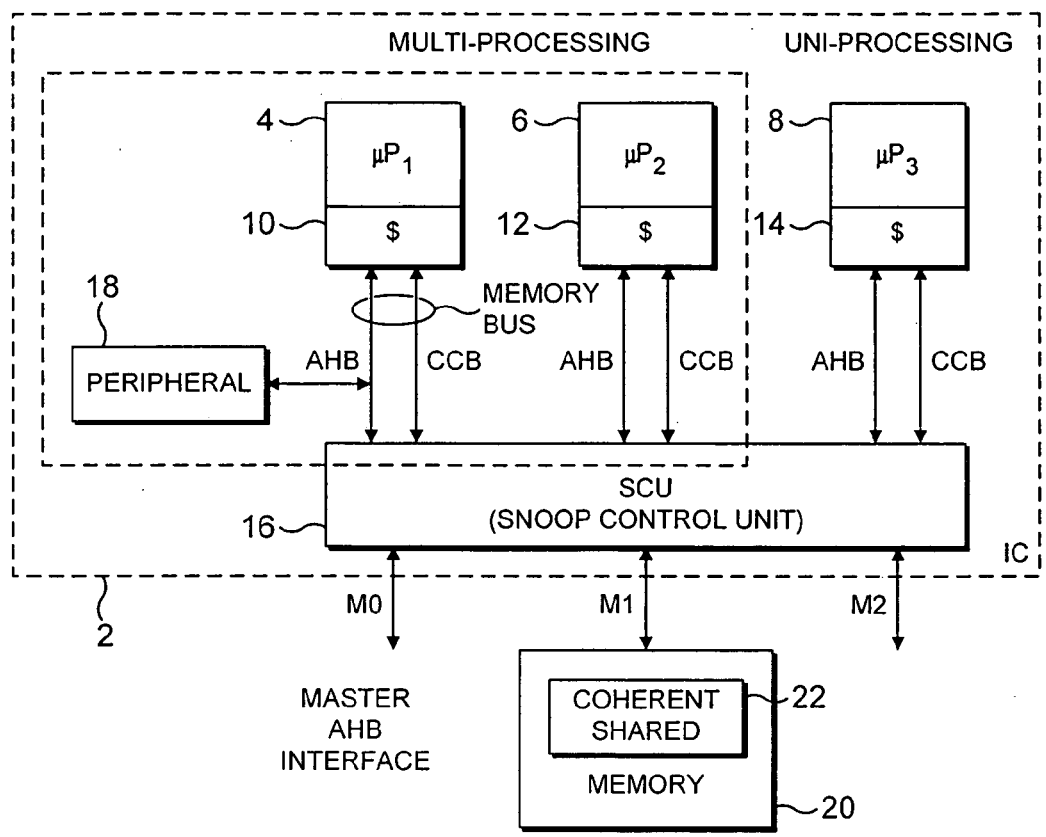
FIG. 1 schematically illustrates a data processing system including a plurality of processor cores.

FIG. 1 schematically illustrates an integrated circuit 2 containing a plurality of microprocessor cores 4, 6, 8, each with an associated cache memory 10, 12, 14. The processor cores 4, 6, 8 are connected by respective memory buses, such as an AMBA High Performance Bus (AHB) (where AMBA is Advanced Microcontroller Bus Architecture), Coherency Control Bus (CCB) to a memory management access unit 16 (also called a snoop control unit). A peripheral device 18 is provided as a private peripheral connected to one of the processor cores 4.

The integrated circuit 2 is coupled to a memory 20 by one of several possible master AHB ports. The memory 20 contains a coherent shared region 22. Memory may be configured and used as non-coherent shared memory when more than one processor has access to it, e.g. a general purpose processor core and a specialist Digital Signal Processor (DSP) core may share access to a common memory region with no control of coherency being performed. Coherent shared memory is distinguished from non-coherent shared memory in that in coherent shared memory the mechanisms by which that memory is accessed and managed are such as to ensure that a write or a read to a memory location within that coherent shared region will act upon or return the current and most up-to-date version of the data value concerned. Thus, coherent shared memory is such that if one processor core makes a change to a data value within the coherent shared region, then another processor core will read that up-to-date data value when it seeks to access that data value. Furthermore, a write to a data value within the coherent memory region 22 will force a change in other stored copies of that data value, at least to the level of ensuring that out-of-date copies are marked as invalid and so subsequently not used inappropriately.

In the system of FIG. 1, the snoop control unit 16 is responsible for managing access to the memory 20, and the coherent shared memory region 22 in particular. The snoop control unit 16 keeps track of which processor cores 4, 6 that are acting in a coherent multi-processing mode are currently holding local copies of a data value from the coherent memory region 22 within their cache memories 10, 12. Coherency management is in itself a known technique. Descriptions of such techniques may be found for example within the Western Research Laboratory Research Report 95/7 entitled "Share Memory Consistency Models: A Tutorial" by Sarita V. Adve and Kourosh Gharachorloo; University of Wisconsin—Madison Computer Sciences Technical Report/902 December 1989; "Week Ordering—A New Definition And Some Indications" by Sarita V. Adve and Mark D Hill; and "An Implementation Of Multi Processor Linux" by Alan Cox, 1995. Whilst coherent multi-processing itself is an established technique, the provision of such capability with reduced hardware complexity overhead, backward compatibility and configuration flexibility is a significant challenge.

Figure 2:
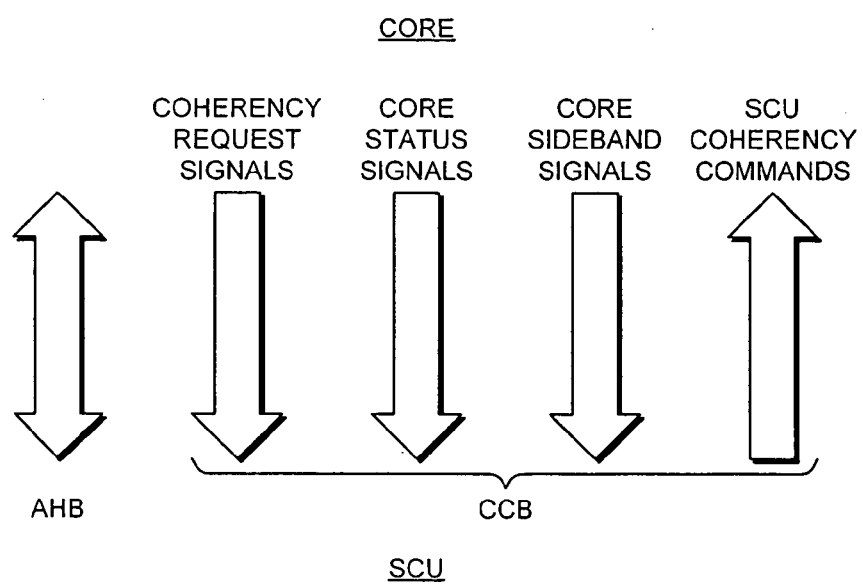
FIG. 2 schematically illustrates a memory bus between a processor core and a memory access control unit.

FIG. 2 illustrates the memory bus between the processor cores 4, 6, 8 and the snoop control unit 16 in more detail. In particular, this memory bus is formed of an AHB bus (AMBA High-Performance Bus) in parallel with a coherency control bus (CCB). The AHB bus has the standard form as is known from and described in documentation produced by ARM Limited of Cambridge, England. This AHB bus is a uni-processing bus with the normal capabilities of operating with processor cores performing uni-processing (or non-coherent multi-processing such as a core and a DSP accessing a shared non-coherent memory). The AHB bus does not provide capabilities for coherent multi-processing. Private peripheral devices, such as a peripheral device 18 as illustrated in FIG. 1, may be connected to this bus without modification providing they do not need to access the coherent multi-processing capabilities of the system. This provides advantageous backward compatibility with existing peripheral designs.

The coherency control bus CCB can be considered to provide a number of respective channels of communication between the attached processor core 4, 6 and the snoop control unit 16. In particular, the core may generate coherency request signals, core status signals and core side band signals which are passed from the processor core 4, 6 to the snoop control unit 16. The snoop control unit 16 can generate coherency commands that are passed from the snoop control unit 16 to the respective processor core 4, 6.

The CCB in particular is used to augment signal values on the AHB to provide additional information from the core 4, 6 to the snoop control unit 16 characterising the nature of a memory access being requested such that the coherency implications associated with that memory access request can be handled by the snoop control unit 16. As an example, line fill read requests for the cache memory 10, 12 associated with a coherent multi-processing core 4, 6 may be augmented to indicate whether they are a simple line fill request or a line fill and invalidate request whereby the snoop control unit 16 should invalidate other copies of the data value concerned which are held elsewhere. In a similar way, different types of write request may be distinguished between by the coherency request signals on the CCB in a manner which can then be acted upon by the snoop control unit 16.

The core status signals pass coherency related information from the core to the snoop control unit such as, for example, signals indicating whether or not a particular core is operating in a coherent multi-processing mode, is ready to receive a coherency command from the snoop control unit 16, and does or does not have a data value which is being requested from it by the snoop control unit 16. The core sideband signals passed from the core to the snoop control unit 16 via the CCB include signals indicating that the data being sent by the core is current valid data and can be sampled, that the data being sent is "dirty" and needs to be written back to its main stored location, and elsewhere as appropriate, that the data concerned is within an eviction write buffer and is no longer present within the cache memory of the core concerned, and other signals as may be required. The snoop control unit coherency commands passed from the snoop control unit 16 to the processor core 4, 6 include command specifying operations relating to coherency management which are required to be performed by the processor core 4, 6 under instruction of the snoop control unit 16. As an example, a forced change in the status value associated with a data value being held within a cache memory 10, 12 of a processor core 4, 6 may be instructed such as to change that status from modified or exclusive status to invalid or shared in accordance with the applied coherency protocol. Other commands may instruct the processor core 4, 6 to provide a copy of a current data value to the snoop control unit 16 such that this may be forwarded to another processor core to service a memory read request, from that processor core. Other commands include, for example, a clean command.

Figure 3:
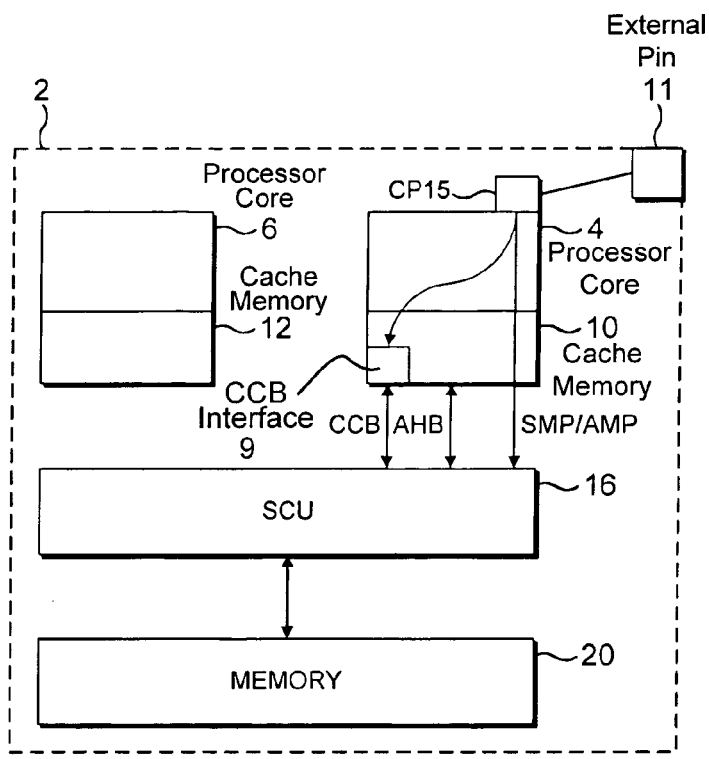
FIG. 3 schematically illustrates a portion of an integrated circuit showing a processor core having a mode control parameter stored in the CP15 register.

FIG. 3 illustrates a section of an integrated circuit 2 according to an embodiment of the invention. The integrated circuit 2, comprises a memory access control unit 16, (often referred to as the snoop control unit or memory management access unit), a memory 20 and a plurality of processor cores 4, 6. The processor cores include processor core 4 that is configurable to operate either in non-coherent processing mode or in coherent multi-processing mode. The other processor cores (not all shown in FIG. 3) may be multi-processor cores, non-coherent processor cores or they may be like processor core 4 configurable to operate as either.

Processor cores operating in coherent multi-processing mode have access to a shared memory region, this region being cachable by the cores operating in coherent multi-processing mode and a defined portion of memory 20. Processor cores operating in non-coherent mode do not access coherent shared memory region and their caches do not mirror any data contained in these regions.

Although memory 20 is shown as a block on the integrated circuit 2, this is purely for ease of illustration and in reality memory 20 may include a variety of data stores on and/or off the integrated circuit and also the caches of the processor cores.

Processor core 4 has an associated cache memory 10 and a mode control parameter storage element, which in this embodiment is part of the CP15 register. The mode control parameter controls the processor core to operate either in non-coherent processing mode or in coherent multi-processing mode. The parameter may be set in a variety of ways including in response to a software command from an application or operating system, or it may be hardware controlled by a signal on an external pin 11.

As in the other embodiments processor core 4 communicates with the snoop control unit via a bus. This bus is divided into two portions, the main or AHB portion and the multi-processing or CCB (coherency control bus) portion. The main portion is used to transmit memory access signals from the processor core to the snoop control unit and from the snoop control unit to the core, the additional portion is used for additional information related to coherency management operations.

In operation when the mode control parameter is set to indicate that the processor core is to operate in non-coherent processing mode, the core acts in response to this signal to de-activate the CCB at CCB interface 9. This means that memory access signals are sent by the AHB bus alone and have no additional coherency related data attached to them. As no additional coherency information is received by the snoop control unit 16 it performs no coherency operations on the memory access request but simply directs the memory access request to the relevant portion of memory 20.

As can be seen from FIG. 3, in addition to controlling the core 4 to de-activate the CCB, the mode control parameter is sent directly to the snoop control unit 16 as an SMP/AMP signal. As in this case the mode control parameter is set to indicate that the processor core 4 is operating in non-coherent processing mode, the signal received by the snoop control unit 16 indicates that the cache 10 of processor core 4 is not mirroring any shared memory. Cache memory 10 is therefore not relevant to the snoop control unit 16 when it is servicing memory access requests from other cores and the snoop control unit 16 therefore ignores cache memory 10 when servicing memory access requests from other processor cores.

When the mode control parameter is set to indicate that processor core 4 is to operate in coherent multi-processing mode, the CCB bus is not automatically de-activated. In this circumstance the core may produce additional information to describe a particular memory access request and act to transmit the memory access request on the AHB bus and the additional data on the CCB bus. The receipt of the additional information on the CCB bus indicates to the snoop control unit that processor core 4 is operating in coherent multi-processing mode and that coherency management operations need to be performed. In some circumstances the memory access request is such that although the core is operating in coherent multi-processing mode it knows that there are no coherency problems associated with this particular request. In these circumstances, for example, where the core knows that the latest version of the data it needs to read is in its own cache, the core acts to de-activate the CCB as in the non-coherent processor mode and no additional information is sent with the memory access request. In this case as in the non-coherent processing mode example the snoop control unit knows that no coherency management operations need to be performed and thus it simply directs the memory access request to the memory location indicated.

As in this case the mode control parameter is set to indicate coherent multi-processing mode, the cache 10 of processor core 4 mirrors part of the shared memory accessible to other processor cores 6 operating in coherent multi-processing mode and is thus relevant to the snoop control unit 16 servicing memory access requests from coherent multi-processing mode processors. As the snoop control unit 16 receives a signal giving the value of the mode control parameter it is aware of this and as such does not ignore the cache 10 of core 4 when servicing memory access requests from other processor cores operating in coherent multi-processing mode.

Figure 4:
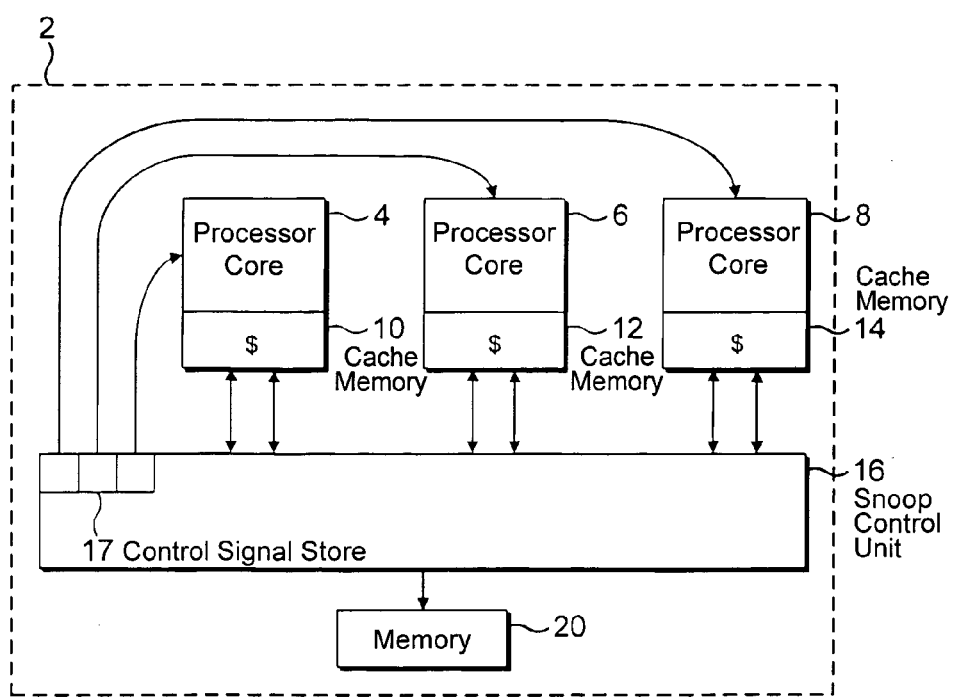
FIG. 4 schematically illustrates an integrated circuit having a mode control parameter stored in the memory control unit.

FIG. 4 shows an alternative embodiment where the processor cores 4, 6, 8 are all configurable to operate either in multi-processing or in non-coherent processing mode. In this embodiment the mode control parameters are not stored on the processor cores themselves but are rather stored on the snoop control unit 16 in a control signal store 17. In the embodiment shown these signals are sent to the cores and can be used by the cores, as in the embodiment illustrated in FIG. 3, to disable the CCB if they indicate the processor core to be operating in non-coherent processor mode. As they are stored on the snoop control unit 16, the snoop control unit has access to them and uses them to determine which processor core caches it needs to access when servicing memory access requests from coherent multi-processing mode processor cores.

Although the two embodiments illustrated have shown the control parameters stored either in the configurable core 4 or on the snoop control unit 16, it would be possible to store these parameters elsewhere on the integrated circuit 2. In all of these embodiments the control parameters may be set in a variety of ways including in response to a software command from an application or operating system, or they may be hardware controlled by a signal on an external pin (not shown).

Figure 5:
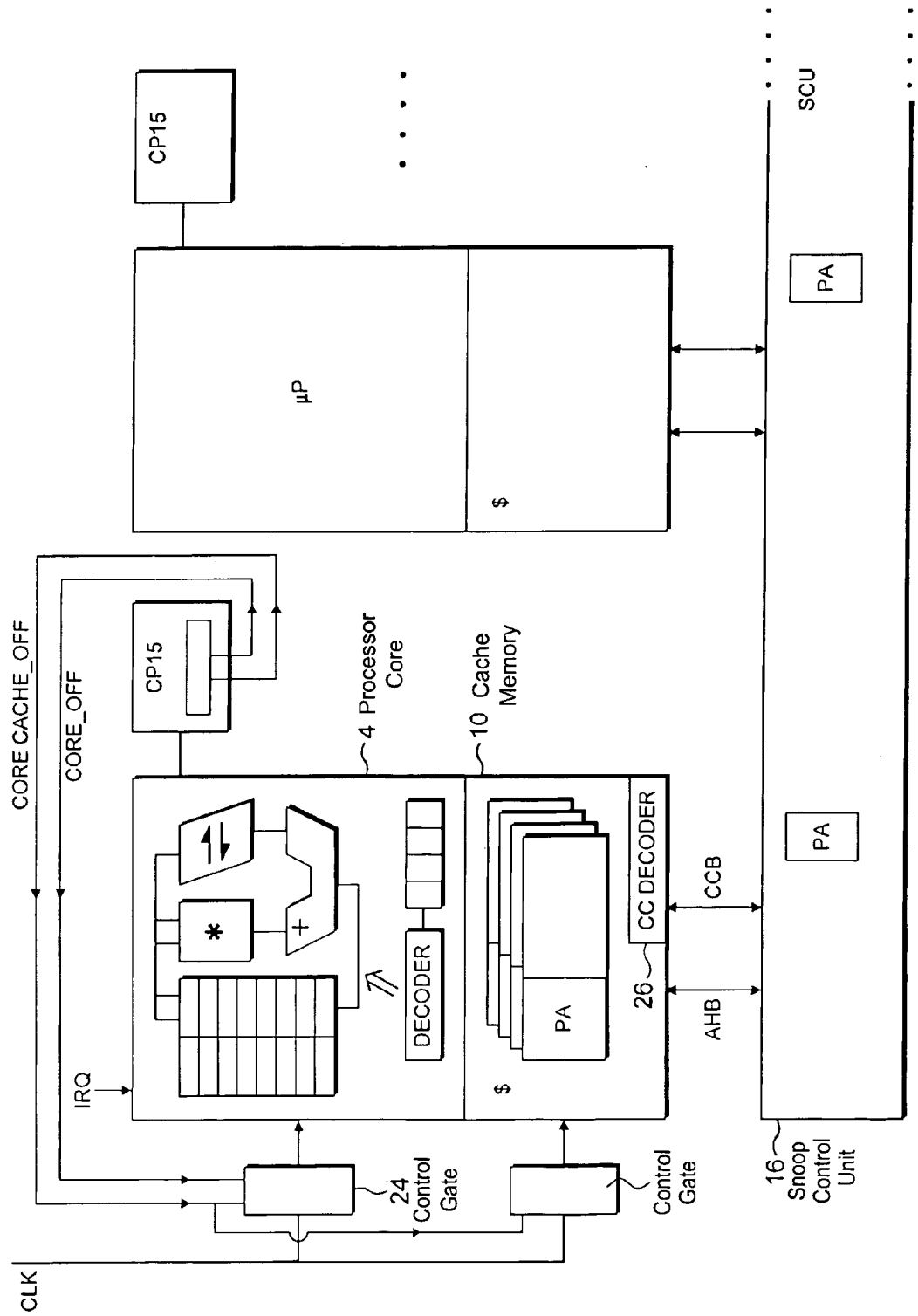
FIG. 5 illustrates a processor core and a cache memory which are separately clocked such that the processor core may be powered down whilst the cache memory remains responsive to coherency management operations.

FIG. 5 schematically illustrates a processor core 4 with an attached cache memory 10. This cache memory 10 is a 4-way physically addressed cache memory. The cache memory 10 is supplied with its own clock signal. The clock signal which is supplied to the processor 4 may be gated off by a control gate 24 whilst the clock continues to be supplied to the cache memory 10. Thus, the processor core 4 may be stopped and placed into a power saving mode by gating off its clock with the control gate 24. A status flag within a core configuration coprocessor CP15 is used to switch the control gate 24 between allowing the clock signal to pass and gating off the clock signal. One type of WFI (wait for interrupt) instruction is used to trigger setting of this status flag and gating of the core clock while the cache clock remains active. Another type of WFI instruction may be used to gate the clock to both the core and the cache.

Within the cache memory 10, a coherency command decoder 26 is provided and is responsive to coherency commands passed via the CCB from the snoop control unit 16. These coherency commands include forcing a change in status associated with a data value held within the cache memory 10, returning a copy of a data value held or cleaning a data value held as instructed by the snoop control unit 16. Thus, whilst the processor core 4 may be placed into a power saving mode to reduce overall system power consumption, the cache memory 10 can remain responsive to coherency management requests issued by the snoop control unit 16 and directed to it via the CCB. This enables significant power saving whilst not compromising the coherency management.

A further description of the multi-processor architecture in general is given in the following:

Terms and Abbreviations

This document uses the following terms and abbreviations.

| Term | Meaning |
| --- | --- |
| SMP | Symmetric Multi-Processing |
| AMP | Asymmetric Multi-Processing |
| L2CC | Level Two Cache Controller |
| WFI | Wait For Interrupt. Low power mode. All clocks in the core are switched off, the core being awaken on the receipt of an interrupt. |

Introduction

We describe hereafter a global Multi-processing platform. The specified architecture should allow both SMP and AMP within the same platform, with the same programmer's model.

A typical MP system includes:
  Memory coherency support;
  Interrupt distribution mechanism;
  Inter-processor communication channels;
  Multi-core debug capabilities;
  Multi-core trace capabilities.

This architecture enables the development of Low Power Multi-processing systems (the WFI state for Low Power mode is supported).

This architecture should scale to cores having a private Level 2 cache.

Ease of integration of this architecture into already existent designs has been considered. The current specification should allow replacing a single core with an SMP-capable system with no other change in the design.

SMP Solution

Coherent Multiprocessing Memory SYSTEM

The chosen solution is shown in FIG. 1:

Two main tasks were identified to produce a multi-processing memory system:
  Add MP extensions to the ARM core to produce a Multiprocessor-capable core. These modifications include moving the core to physical addressing, updating the cache line states, and adding a Coherency Control Bus (CCB) at core interface;

Produce a block responsible for the memory system coherency, dubbed the Snoop Controller Unit (SCU). This block implements the MESI coherency protocol at the system level and sends coherency requests to cores in the memory system.

SMP-Capable Cores

Standard ARM cores should be modified to take advantage of the Multi-Processing environment:

- They can and receive messages to/from the Snoop Control Unit (SCU) through the Coherency Control Bus (CCB);
- They handle SMP information in their cache lines, like basic MESI states, SMP/AMP awareness and migratory-lines detection;
- They may provide new MP instructions, to support a better locking mechanism.

However, an important point is that an SMP capable core will still be compatible with the standard AHB bus, and can work seamlessly in a non-Multiprocessing memory environment.

The Snoop Controller Unit

In the ARM MP-architecture, a centralized unit (dubbed the SCU, for Snoop Control Unit) controls AHB requests coming from the cores and checks them for coherency needs. This unit ensures that memory consistency is maintained between all caches. When necessary it sends control messages to data caches (INVALIDATE, CLEAN or COPY commands) and redirects memory transfers (directly between processors, or to the external AHB interface).

Different features can be added to the SCU. These features are mostly transparent to the programmer, and can improve performance and/or power consumption. These may be configurable, and can be arranged to ensure that their default configuration does not change the programmer's model. Although this is not mandatory, the SCU can for example maintain a local copy of all processors DATA TAG arrays to speed-up coherency lookups without having to ask (and therefore stall) processors in the memory system.

The SCU also uses an external master AHB interface. This interface can send writes requests to memory, and read data from the main memory if the requested line is not present in other Data caches (snoop miss). In order to ease the implementation of a SMP-capable system, this external interface is designed to plug easily to a L2CC, an AMBA3 wrapper or a standard AHB bus.

Coherent Protocol and Busses

Snooping Activity and Coherency Protocol

At the SCU level, each memory request coming from an SMP core generates a coherency check. Only data-side caches of processors in the SMP memory system are looked up for the required data.

The cache coherency protocol used for the Core-SCU communication is based on the MESI protocol. However, it has been modified using a Berkeley approach to improve its performance and power consumption.

In a Multiprocessing memory system, the consistency model is an important piece of the Programmer's model. It defines how the programmer should expect the memory content to change while issuing reads and writes. The consistency model of the ARM MP architecture is the Weak Ordering model, which ensures correct program behaviour using synchronisation operations.

Coherency Control Bus

A bus between the core and the SCU, dubbed the Coherency Control Bus (CCB), is responsible for passing messages between the SCU and the cores. This defines a standard interface between a SMP capable core and the SCU.

As the SMP architecture evolves this allows the SMP-core interface to remain stable.

This bus is also providing status signals mandatory to implement Multiprocessing features, as described in the Supported Features section given below.

Supported Features

SMP/AMP Attribute

In a multiprocessor system, one could imagine dedicating one or more processor(s) to non-SMP tasks/OS. This means that this (these) processor(s) will never handle shared data.

This can be the case if someone wants to avoid porting applications from one OS to a new one. The solution is to run a separate OS on a dedicated processor, even if this OS is not SMP capable. This can also be considered for specific tasks/threads that do not need any OS support, like for example when running a dedicated multimedia task on a separate processor (which may have a specific or private coprocessor).

Processing coherency checks on each AHB request from these processors is useless, since they will never share data, and it penalises the performances of both the whole system (since you will add load to the SCU) and the processor itself (since you introduce latency on the AHB request for looking for coherency needs).

An attribute in CP15 defines whether the processor is working in symmetrical mode or not. It defines if AHB requests from the processor should be taken into account by the SCU and whether this processor's Data cache has to be looked at upon coherency requests from other processors.

This attribute is sent to the SCU as a SCSMPNAMP bit.

Direct Data Intervention

Description

When a processor requires a line which is stored in another processor's cache, the SCU can transmit the line from the processor having it to the one requesting it.

The goal is to limit accesses to the following memory level, those accesses penalising both timing and power consumption. The SCU will hence get the line from the owner, and will forward it to the requiring processor.

Different line status changes are defined, depending on the state of the line in the owning processor (Modified, Shared or Exclusive), the type of request (read or write) and whether the migratory line feature is enabled or not.

Coherency with Core OFF and Caches ON

An additional Wait-for-Interrupt instruction has been defined that allows turning off the core while maintaining coherency in the L1 caches (caches ON).

MP-capable cores thus have two Wait-for-interrupt instructions:

- A WFI instruction that puts both the core and the caches in a low-power state.
- A WFI instruction that puts the core in a low-power state while the caches are still ON and able to service coherency requests from the SCU (FORCE/COPY and CLEAN operations)

Both WFI instructions are implemented as CP15 instructions.

The way the low-power state is achieved is through clock-gating. A module at the CPU level stops the clock of the core or the clock of both the core and the cache.

The core escapes the low-power WFI state upon reception of an interrupt.

The Coherency Control Bus (CCB)

The Coherency Control Bus (CCB) is responsible for passing coherency messages between an ARM MP-capable core and the Snoop Controller Unit (SCU).

This bus is originally designed for a multi-processing system based on the ARM1026 core family. The AMBA bus used between the ARM1026 core and the SCU is a private one.

However, the defined CCB specification is also applicable to the following memory environments:
AHB-lite memory systems (using multiple private slaves at the core level)
Full AHB memory systems (featuring multiple masters at the core level)
AXI memory systems (AHB 3.0) with minor modifications.

The bullet specification of this Coherent Control Bus (CCB) is:
Sideband signals are added to the AMBA bus at the master interface, on control and data paths;
Coherent AMBA requests (requests with the SCREQ sideband signal asserted) must be dispatched to the Snoop Control Unit;
The Snoop Controller Unit uses a private channel to send coherency commands to the core;
Requested coherent data and core notification messages are sent to the SCU as AMBA write accesses;
In the following chapter, we present the CCB scheme with more details in an AHB 2.0 memory environment.

CCB Overview

Sideband Signals on Core Requests

When sending a memory request on the AMBA bus, a Multi-Processing aware core sets the "CCB core sideband" signals to indicate what type of memory burst is needed.

The value of this sideband bus distinguishes between the following operations:
standard Read and Write AMBA requests;
coherent "Line Fill" and "Line Fill and Invalidate" read requests;
coherent "Write Through and Invalidate", "Write Not Allocate and Invalidate" and "Invalidate" write requests;
"CP15 Invalidate" and "CP15 Invalidate All" notifications;
requested "CLEAN/COPY data transfers";
A precise list of signals with their encoding is available below.

SCU Coherency Command Channel

While ensuring the memory system consistency, the SCU may have to send coherency commands to all cores in the memory system.

The following coherency operations are defined:
change the state of a cache line (FORCE command);
change the state of a cache line and CLEAN the line contents on the bus;
change the state of a cache line and COPY the line contents on the bus;
do nothing (NOP command).

Together with the coherency operation, a MESI state is sent. It indicates the final state of the cache line once the coherency operation has been processed.

The Snoop Controller Unit uses a private communication channel to send coherency commands to the core:
the SCOP bus indicates to the core which coherency operation is needed;
the SCCOREREADY signal indicates to the SCU if the current coherency request has completed, and if the core is ready to process another request (in a similar way to the AHB HREADY signal).

This bus does not depend on the AMBA bus. If a coherency request is required by the SCU while the SCCOREREADY signal is asserted, the core has to register the coherency request and drop the SCCOREREADY signal.

The SCCOREREADY signal should remain LOW as long as the core has not completed the coherency operation.

Please refer to timing diagrams and description below for more information regarding coherency requests management.

Sending CP15 Notifications

When a core issues a "CP15 INVALIDATE" or "CP15 INVALIDATE ALL" command on its data cache, it has to send a message to the SCU unit. This message is needed to force the SCU to update its Dual Tag arrays.

This "CP15 notification" message is sent by the core as a single AHB WRITE cycle as follows (see timing diagrams):
SCREQ=HIGH, indicating a coherent request addressed to the SCU block;
SCINV=LOW and SCDATA=LOW, indicating a "CP15 INVALIDATION" notification message;
The WDATA bus value is not relevant for this message. At the SCU level, this request is considered as "CP15 notification", and thus will not be forwarded to main memory;
The HADDR bus value is not relevant for this memory access. Instead this bus contains the Index+Way address for the invalidation operation.

This means that the AMBA address decoding logic (if any) sitting between the core and the SCU should always select the SCU slave port when receiving a memory request which has the SCREQ bit asserted.

Processing Coherency Requests at the Core Level

When the core receives a coherency command coming from the SCU on the SCOP bus, it registers the requested operation and is getting prepared to service the request.

Many cases may appear at the core interface:
a) If the core is not processing any memory transfer at the BIU interface, it can start the coherency request immediately (FORCE/CLEAN/COPY).
If cleaned/copied data must be sent back to the SCU, the core produces an incrementing AMBA WRITE burst as follows (see timing diagrams below):
SCREQ=HIGH, indicating a coherent request addressed to the SCU block;
SCINV=LOW and SCDATA=HIGH, indicating a "COPY/CLEAN transfer";
The SCDATAVALID and SCDIRTYWR are updated on a data basis;
As for CP15 notification messages, the HADDR sent value is not relevant for this message.
At the SCU level, this message is considered as a "COPY/CLEAN transfer" and will not be forwarded to main memory.

b) If the core is processing/requesting a non-coherent data (SCREQ signal is not asserted), it can complete his current burst as usual. This is the case when the core is processing either a memory transfer to a private slave or a non-coherent memory transfer to the SCU.

Once the burst has completed, the core must then process the "CLEAN or COPY data transfer" as explained in case a/.

c) If the core is processing/requesting a memory request (SCREQ signal is asserted), this means that the core is currently issuing a coherent memory transfer with the SCU.

In this case, the transfer cannot complete until the core has serviced the coherency command sent by the SCU. The reason for this behaviour is that it may hide a deadlock case for the memory system.

It is guaranteed that the SCU will not process the stalled request further (by asserting HREADY to HIGH or sending data back) until the coherency command has been serviced. The core must start processing the coherency request (FORCE/CLEAN/COPY).

If cleaned/copied data must be sent back to the SCU, the core can send it to the SCU on the WDATA bus while setting SCDATAVALID and SCDIRTYWR signals on a data basis (see timing diagrams below).

CCB Signals

The Coherency Control Bus (CCB) can be divided in 4 signal groups:

Core coherency request signals: these signals are controlled by the core and are sent in parallel with the AMBA request. They indicate if the AMBA request is a coherent one, and tell the SCU what kind of coherency action is required. The following coherent memory requests are defined:

LF [Line fill]: issued when a read miss happens in a processor. This command requests a line in either shared or exclusive state. The final state will depend on the SCU's answer.

LFI [Line Fill and Invalidate]: issued when a write miss happens in a processor, if Write Allocation is enabled. This command requests exclusive ownership of a line.

WTI [Write Through Invalidate]: issued when the cache is configured in Write Through mode. In this case, the SCU must invalidate the corresponding line in other processors if needed. In the case where the processor has already the line either in Exclusive or Modified state, the command will not be issued.

WNAI [Write non-allocate invalidate]: Issued when the cache is configured in write non-allocate mode, and the line isn't in the cache. The SCU must then invalidate the line in other processors if needed.

Invalidate: issued on a Write Hit to the cache, with the line being in shared state. We do not need to send data on the bus. Upon reception of this message, the SCU invalidates lines in other caches.

CP15 invalidations: those messages are used to update the DUAL TAG ARRAYS located in the SCU.

Core status signals: these signals are coherency status signals sent by the core. They indicate if the core is ready to process coherency commands coming from the SCU, and they give the status of the current coherency request.

Core sideband signals: these signals are sent by the Core in parallel with the data during a coherency operation.

SCU command signals: these signals are used by the SCU to send coherency commands to the core.

| Core coherency request signals (in parallel with AHB request) | | | |
|---|---|---|---|
| Name | Width | Output | Description |
| SCREQ | 1 bit | Core | Indicates that the AMBA request must be checked for coherency. It remains stable for the duration of the request. SCREQ must always be equal to zero if SCSMPnAMP is clear or if the request is not addressed to the SCU. SCREQ = 1'b0: normal AHB reads and writes - no coherency check is performed. SCREQ = 1'b1: the current request is a coherent request/message addressed to the SCU. |
| SCINV | 1 bit | Core | Together with the type of the AHB transaction and SCREQ, distinguishes between: LF (0) and LFI (1) requests; CP15 operations or coherent COPY/CLEAN DATA TRANSFERS (0) and WTI/WNAI or INVALIDATION (1) requests; This signal is stable during a memory request. |
| SCWT | 1 bit | Core | Together with the type of the AHB transaction and SCREQ, distinguishes between: WNAI (0) and WTI (1) requests. This signal is stable during a memory request. |
| SCALL | 1 bit | Core | Together with the type of the AHB transaction and SCREQ, distinguishes between: CP15 INVALIDATE (0) and CP15 INVALIDATE ALL (1) requests. This signal is stable during a memory request. |
| SCDATA | 1 bit | Core | Together with the type of the AHB transaction and SCREQ, distinguishes between: INVALIDATE (0) and WTI/WNAI (1) requests CP15 INVALIDATE/CP15 INVALIDATE ALL operations (0) and coherent COPY/CLEAN DATA TRANSFERS (1) |
| SCWAY | 4 bits | Core | Indicates which cache way is used by the core for the current Line Fill request. It is also used with the "CP15 INVALIDATE ALL" message to indicate which ways are to be cleaned. This signal is encoded using 1 bit per cache way. |

Core status signals

| Name | Width | Output | Description |
|---|---|---|---|
| SCSMPnAMP | 1 bit | Core | Indicates whether or not the processor is part of the SMP system, i.e. if this processor's Data cache has to be looked at upon coherency requests from other processors. When clear, the processor is totally isolated from the MP cluster and is not part of the snooping process. The Dual Tag array information is not maintained for this processor.<br>The SCSMPnAMP value can be changed at the core level through a CP15 operation. It must remain stable when a memory request is being processed. |
| SCCOREREADY | 1 bit | Core | Indicates that the core is ready to receive a coherency request from the SCU (See timing diagrams below). |
| SCnPRESENT | 1 bit | Core | Not Present bit: indicates that the line requested by the SCU is no longer present in the core's cache.<br>This signal is valid in the cycle when SCCOREADY indicates the completion of the request (See timing diagrams below). |

Core sideband signals

| Name | Width | Output | Description |
|---|---|---|---|
| SCDATAVALID | 1 bit | Core | Indicates that the data sent by the core is valid and can be sampled (See timing diagrams below). |
| SCDIRTYWR | 1 bit | Core | Dirty attribute sent along with the data for COPY and CLEAN coherency operations (See timing diagrams below). |
| SCEWBUPDATE | 1 bit | Core | Indicates that a data line has been placed in the Eviction Write Buffer in core and is not present in the data RAM.<br>Valid on cache Line Fills, and in the first cycle of a "CP15 INVALIDATE" message (See timing diagrams below). |

SCU command signals

| Name | Width | Output | Description |
|---|---|---|---|
| SCOP | 2 bits | SCU | Coherency operation sent by the SCU to the core:<br>"00": NOP<br>"01": FORCE cache line state value<br>"10": COPY<br>"11": CLEAN |
| SCUMIG | 1 bit | SCU | Indicates that the incoming cache line is migratory so that the Cache State Machine can react accordingly (optional signal). |
| SCADDR | 32 bits | SCU | Snooping Address bus<br>This bus is used to send coherency requests to a core. It can hold a Physical Address, an Index/Way value, or a direct link to the core's Eviction Write Buffer. |
| SCSTATE | 2 bits | SCU | Indicates the final cache line state after a coherency operation or a "Line Fill"/"Line Fill Invalidate" request (See timing diagrams):<br>"00": Invalid<br>"01": Shared<br>"10": Exclusive<br>"11": Modified |

| | | | Coherency messages encoding (Core to SCU) | | | |
|---|---|---|---|---|---|---|
| SCREQ | HWRITE | SCINV | SCDATA | SCWT | SCALL | Coherency message |
| 0 | — | — | — | — | — | Standard memory request |
| 1 | 0 | 0 | — | — | — | Line Fill request |
| 1 | 0 | 1 | — | — | — | Line Fill and Invalidate request |
| 1 | 1 | 0 | 0 | — | 0 | CP15 INVALIDATE request |
| 1 | 1 | 0 | 0 | — | 1 | CP15 INVALIDATE ALL request |
| 1 | 1 | 0 | 1 | — | — | coherent CLEAN/COPY transfer |
| 1 | 1 | 1 | 0 | — | — | INVALIDATE request |
| 1 | 1 | 1 | 1 | 0 | — | WNAI request |
| 1 | 1 | 1 | 1 | 1 | — | WTI request |

AHB2.0 Timing Diagrams

The following timing diagrams explain the core/SCU communication:
Line Fill example;
Invalidate All example;
FORCE command example (Not Present case);
COPY command example (hit case);
CLEAN command example (miss case);
Coherent write burst delayed by a COPY command.

Figure 6:
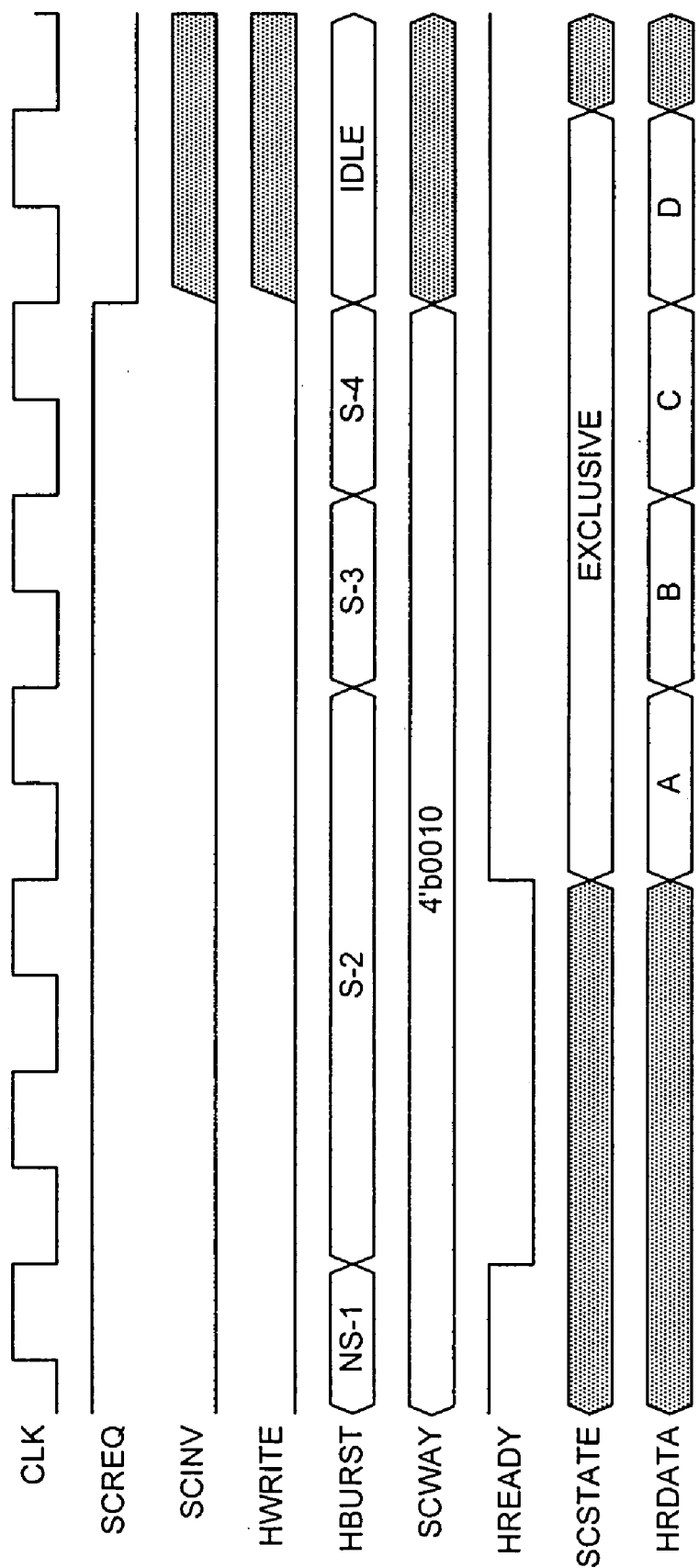
FIGS. 6 to 11 illustrate further details of a multi-processor architecture and bus interface in accordance with example embodiments of the present techniques.

Coherent Line Fill Request
(See FIG. 6)

Figure 7:
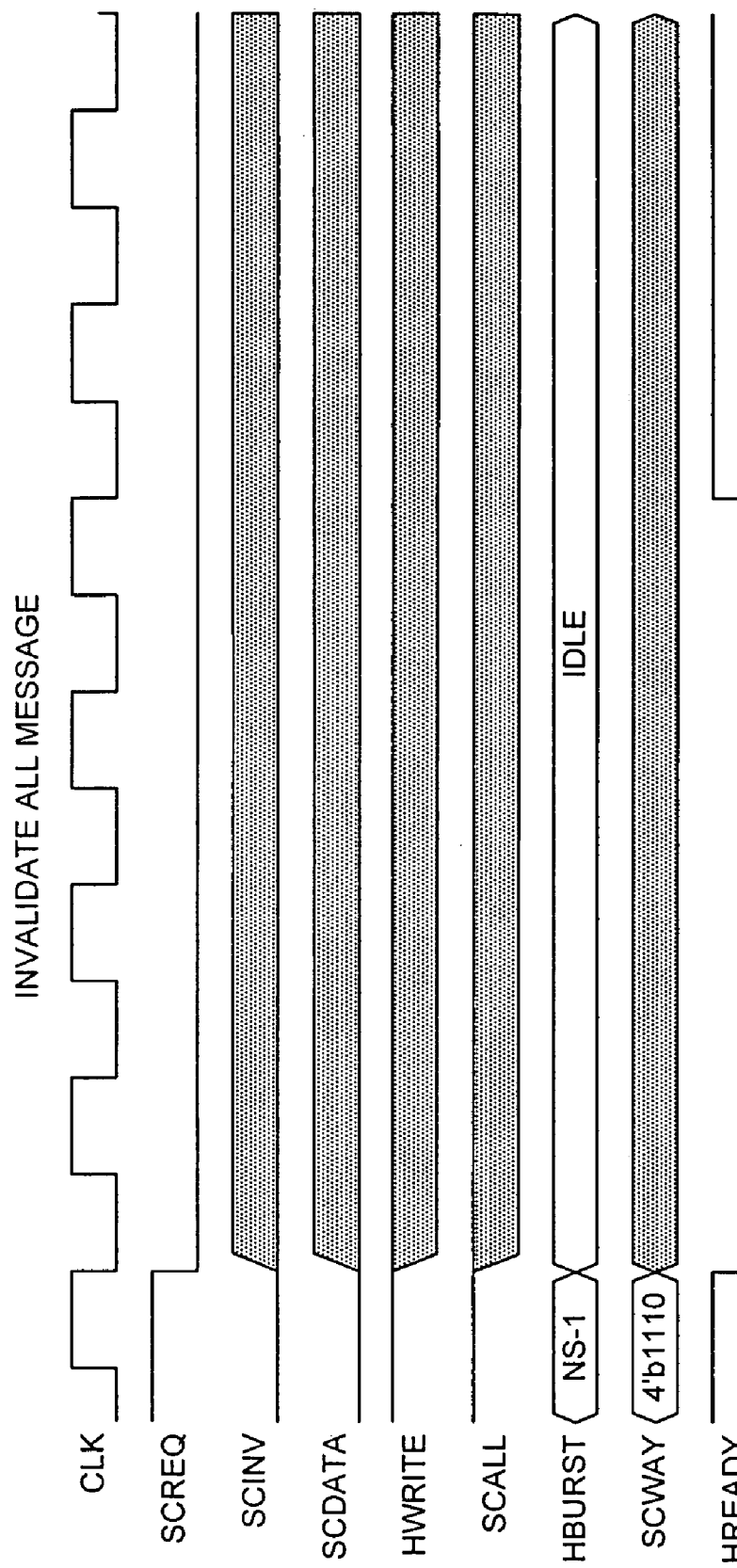
Figure 8:
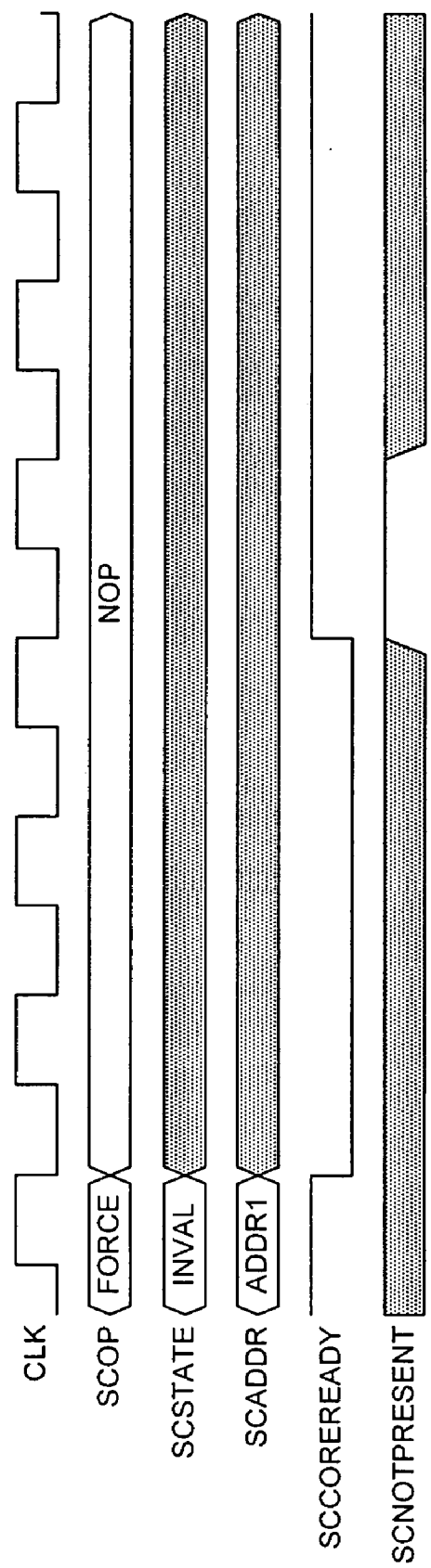

INVALIDATE ALL Message
(See FIG. 7)
FORCE Command (not Present Case)
(See FIG. 8)

Figure 9:
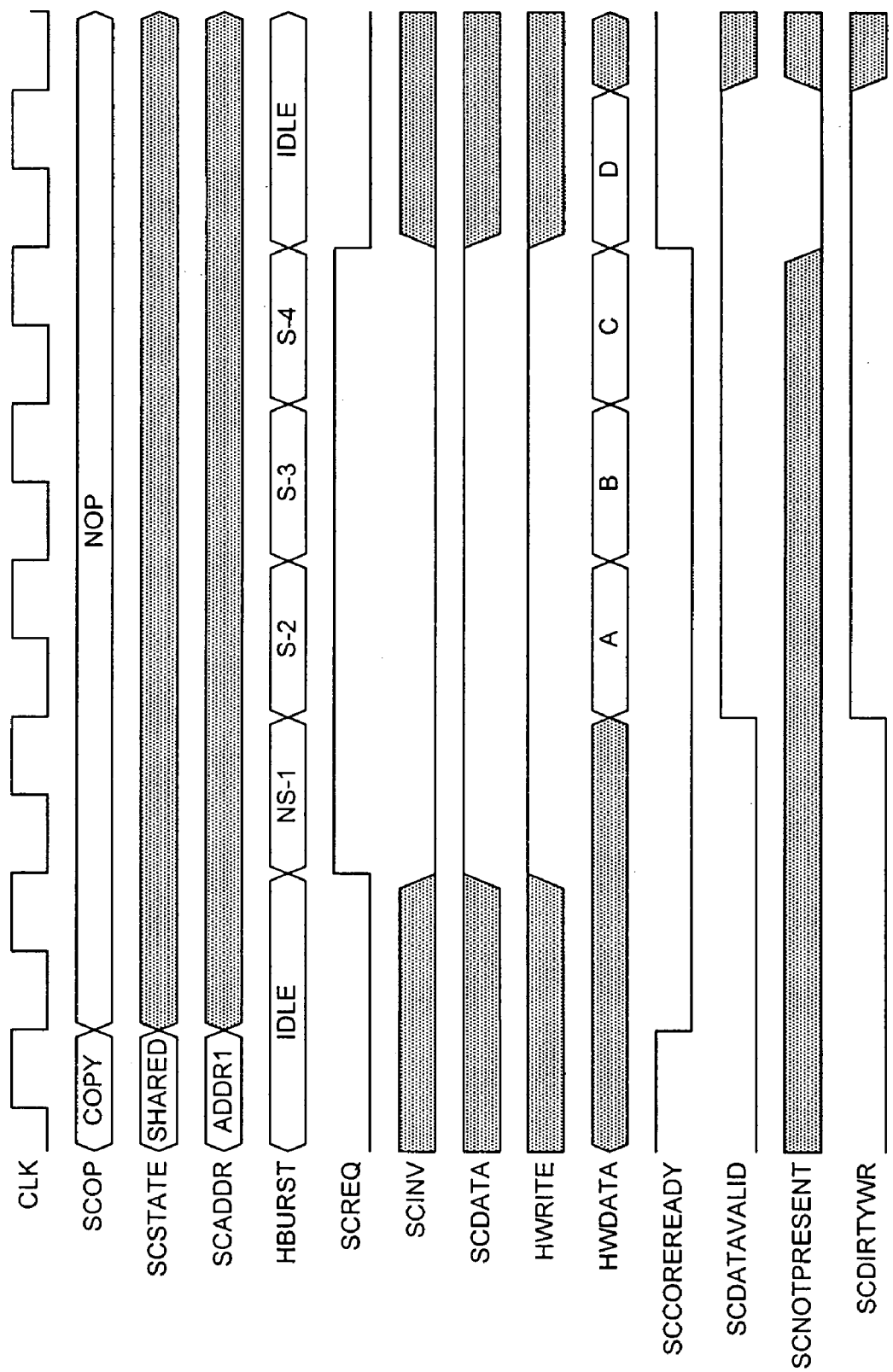

COPY Command (hit case)
(See FIG. 9)

Figure 10:
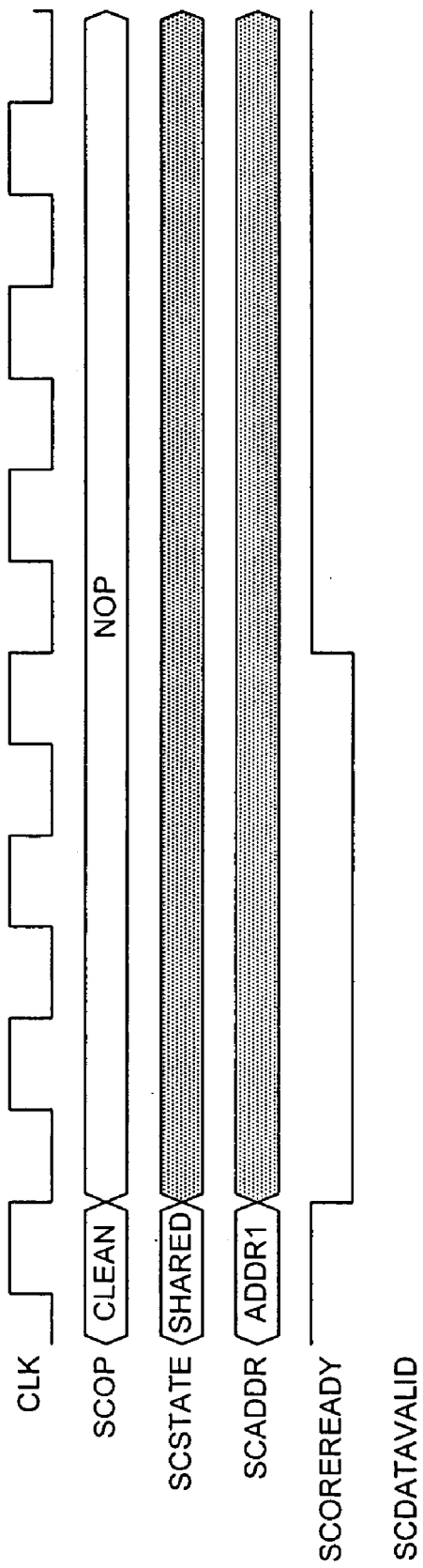

CLEAN COMMAND (miss case)
(See FIG. 10)

Figure 11:
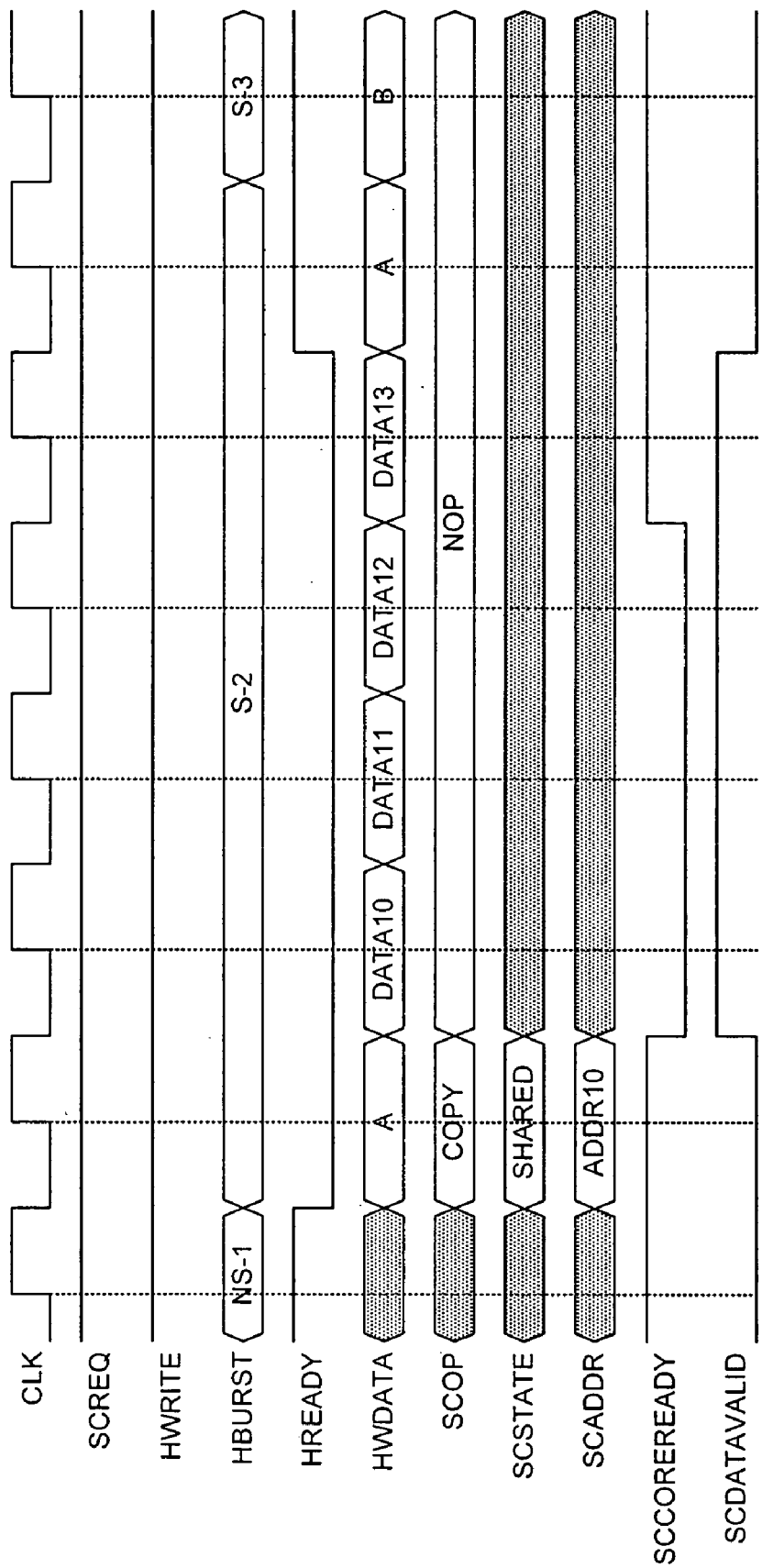

Coherent Write Burst Delayed by a COPY Command
(See FIG. 11)

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
a plurality of processor cores operable to perform respective data processing operations, at least two of said processor cores being operable in a coherent multi-processing mode sharing access to a coherent memory region; and
a memory access control unit operable to receive memory access requests via respective memory buses from said plurality of processor cores and in response to a memory access request from one of said processor cores operating in said coherent multi-processing mode to perform coherent multi-processing management operations to control access to said coherent memory region; wherein
at least those memory buses of processor cores operating in said coherent multi-processing mode include a main portion and a coherent multi-processing portion, said main portion carrying main signals generated by said processor cores and specifying a memory access request using a uni-processing memory request protocol and
said coherent multi-processing portion carrying additional signals generated by said processor cores and used by said memory access control unit in combination with said main signals to perform coherent multi-processing management operations to control access to said coherent memory region.

2. Apparatus as claimed in claim 1, wherein said main signals include at least one signal specifying whether a memory access request is a write request and said additional signals include one or more signals distinguishing between different types of write request.

3. Apparatus as claimed in claim 1, wherein said main signals include at least one signal specifying whether a memory access request is a read request and said additional signals include one or more signals distinguishing between different types of read request.

4. Apparatus as claimed in claim 1, wherein at least one of said processor cores operating in said coherent multi-processing mode includes a cache memory operable to store a copy of a data value stored in a main memory, said memory access control unit being operable to manage coherence between said data value stored in said cache memory and said data value stored in said main memory in response to a memory access request to said data value from another processor core.

5. Apparatus as claimed in claim 1, wherein said coherent multi-processing portion carries additional signals generated by said memory access control unit specifying coherency control operations to be performed by a processor core.

6. Apparatus as claimed in claim 1, wherein at least one of said processor cores is operable in a uni-processing mode and uses a memory bus having a main portion carrying said main signals to specify uni-processing memory access requests.

7. Apparatus as claimed in claim 1, wherein at least one of said processor cores operable in said coherent multi-processing mode is coupled to a peripheral device by said main portion of said memory bus, operation of said peripheral device being independent of said additional signals.

8. Apparatus as claimed in claim 1, wherein said coherent multi-processing portion carries additional signals generated by a processor core operable in said coherent multi-processing mode and specifying messages to be passed from said processor core to said memory access control unit.

9. Apparatus as claimed in claim 1, wherein said apparatus comprises an integrated circuit including said plurality of processor cores, said memory access control unit and said memory buses.

10. A method of processing data, said method comprising the steps of:
- performing data processing operations upon respective ones of a plurality of processor cores, at least two of said processor cores being operable in a coherent multi-processing mode sharing access to a coherent memory region; and
- receiving memory access requests from said plurality of processor cores at a memory access control unit via respective memory buses; and
- in response to a memory access request from one of said processor cores operating in said coherent multi-processing mode, performing coherent multi-processing management operations to control access to said coherent memory region; wherein
- at least those memory buses of processor cores operating in said multi-processing mode include a main portion and a coherent multi-processing portion,
- said main portion carrying main signals generated by said processor cores and specifying a memory access request using a uni-processing memory request protocol and
- said coherent multi-processing portion carrying additional signals generated by said processor cores and used by said memory access control unit in combination with said main signals to perform coherent multi-processing management operations to control access to said coherent memory region.

11. A method as claimed in claim 10, wherein said main signals include at least one signal specifying whether a memory access request is a write request and said additional signals include one or more signals distinguishing between different types of write request.

12. A method as claimed in claim 10, wherein said main signals include at least one signal specifying whether a memory access request is a read request and said additional signals include one or more signals distinguishing between different types of read request.

13. A method as claimed in claim 10, wherein at least one of said processor cores operating in said coherent multi-processing mode includes a cache memory operable to store a copy of a data value stored in a main memory, said memory access control unit being operable to manage coherence between said data value stored in said cache memory and said data value stored in said main memory in response to a memory access request to said data value from another processor core.

14. A method as claimed in claim 10, wherein said coherent multi-processing portion carries additional signals generated by said memory access control unit specifying coherency control operations to be performed by a processor core.

15. A method as claimed in claim 10, wherein at least one of said processor cores is operable in a uni-processing mode and uses a memory bus having a main portion carrying said main signals to specify uni-processing memory access requests.

16. A method as claimed in claim 10, wherein at least one of said processor cores operable in said coherent multi-processing mode is coupled to a peripheral device by said main portion of said memory bus, operation of said peripheral device being independent of said additional signals.

17. A method as claimed in claim 10, wherein said coherent multi-processing portion carries additional signals generated by a processor core operable in said coherent multi-processing mode and specifying messages to be passed from said processor core to said memory access control unit.

18. A method as claimed in claim 10, wherein said plurality of processor cores, said memory access control unit and said memory buses are part of a single integrated circuit.

* * * * *